United States Patent [19]

Jansen-Herfeld et al.

[11] 4,114,270
[45] Sep. 19, 1978

[54] BUTCHER'S MEAT SAW

[75] Inventors: Rottger Jansen-Herfeld, Remscheid; Stefan Elmer, Oetisheim, both of Fed. Rep. of Germany

[73] Assignee: Schmid & Wezel, Maulbronn, Fed. Rep. of Germany

[21] Appl. No.: 809,516

[22] Filed: Jun. 24, 1977

[30] Foreign Application Priority Data

Dec. 12, 1976 [DE] Fed. Rep. of Germany ....... 2657665

[51] Int. Cl.² .............. G01C 15/10; B27B 17/00
[52] U.S. Cl. .................................... 30/394; 17/23; 30/273; 83/746; 83/821
[58] Field of Search .................. 30/392–394, 30/272 A, 219, 220, 273; 83/820, 821, 746; 74/45; 128/317; 17/23; 125/16 L

[56] References Cited

U.S. PATENT DOCUMENTS

| 828,681 | 8/1906 | Replogle | 30/273 |
| 1,838,125 | 12/1931 | Wirtz | 30/394 |
| 2,824,455 | 2/1958 | Ristow | 128/317 X |
| 2,895,514 | 7/1959 | Wright | 30/394 |
| 3,064,698 | 11/1962 | La Force | 83/746 |
| 3,170,496 | 2/1965 | Kohler | 30/392 |
| 3,337,952 | 8/1967 | Rosen | 30/272 A |
| 3,748,738 | 7/1973 | Alexander | 30/394 |

FOREIGN PATENT DOCUMENTS 1,019,036 10/1952 France ........................ 30/392

Primary Examiner—N. P. Godici
Attorney, Agent, or Firm—Michael J. Striker

[57] ABSTRACT

A butcher's meat saw has a housing from which extends a flat guide plate having an edge along which is slidable a blade reciprocated by an eccentric-type drive mechanism within the housing. Either the edge of the guide or the edge of the blade is formed with a groove and the other edge fits in this groove. One of these edges is furthermore formed with laterally opened notches so as to facilitate cleaning of the saw.

16 Claims, 12 Drawing Figures

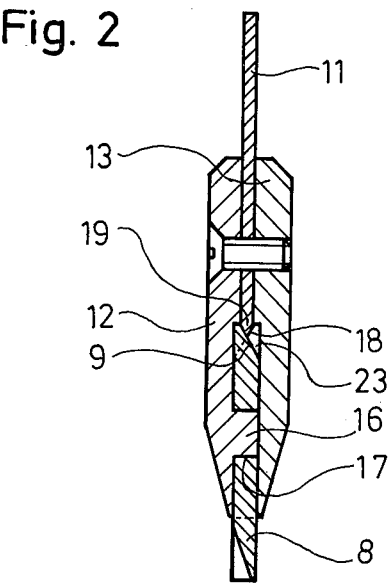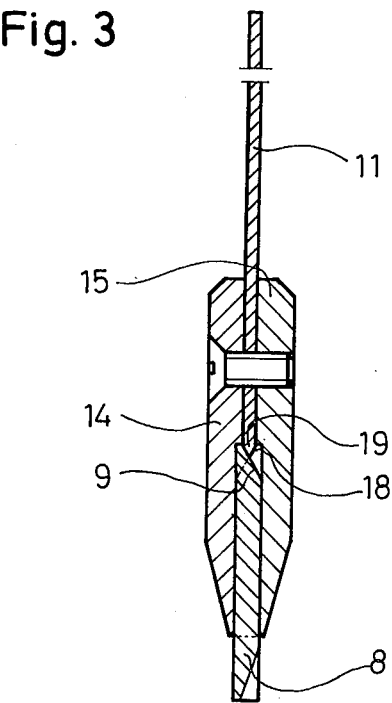

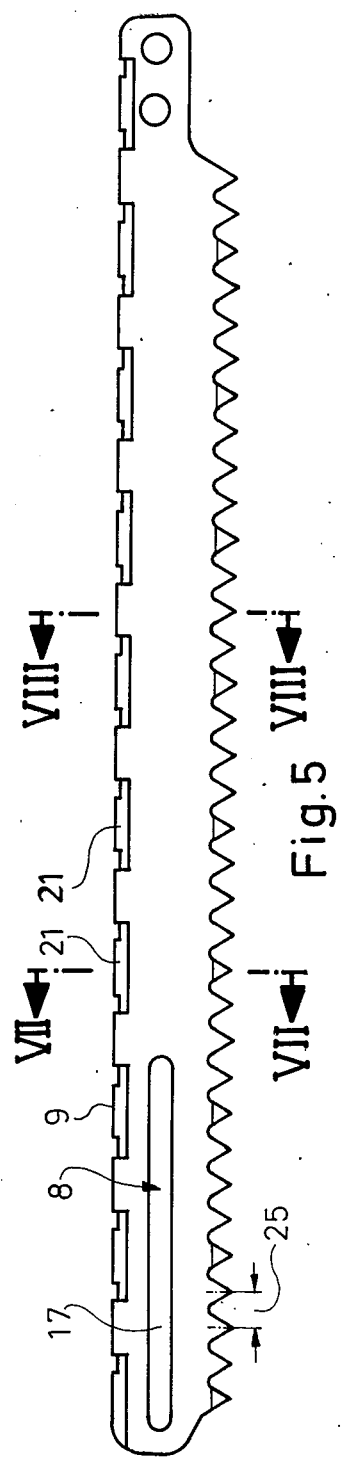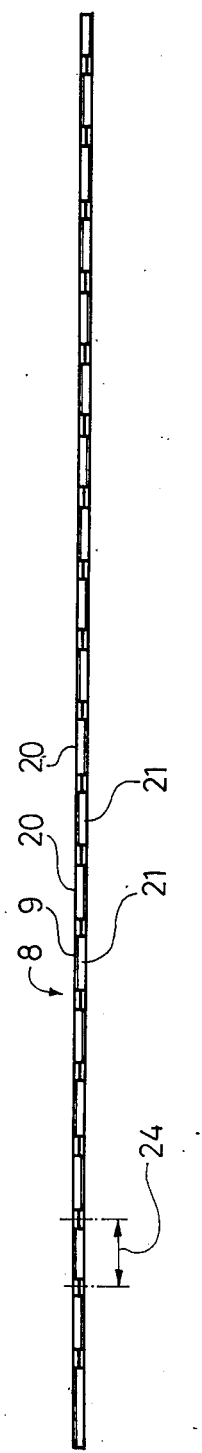

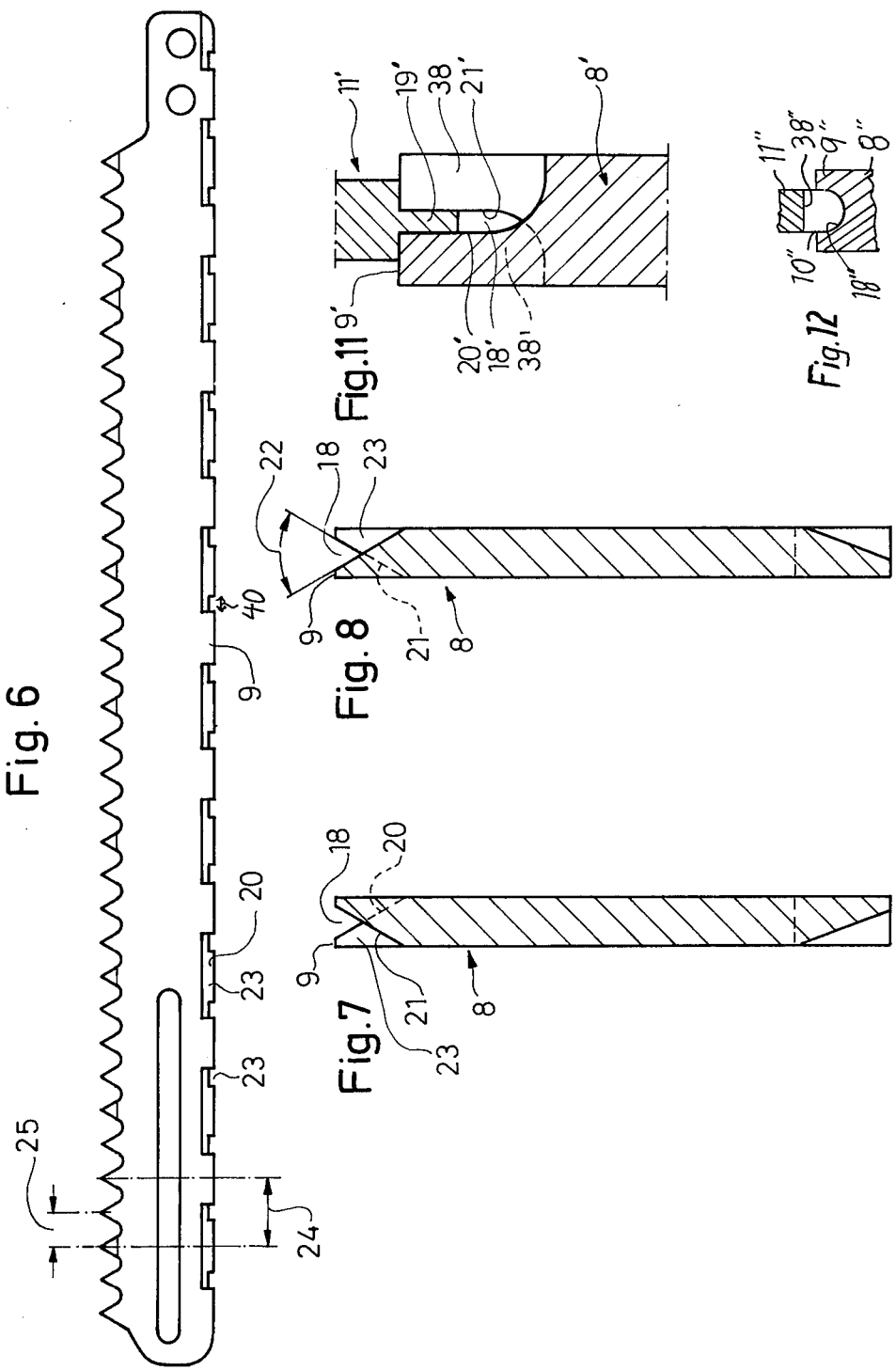

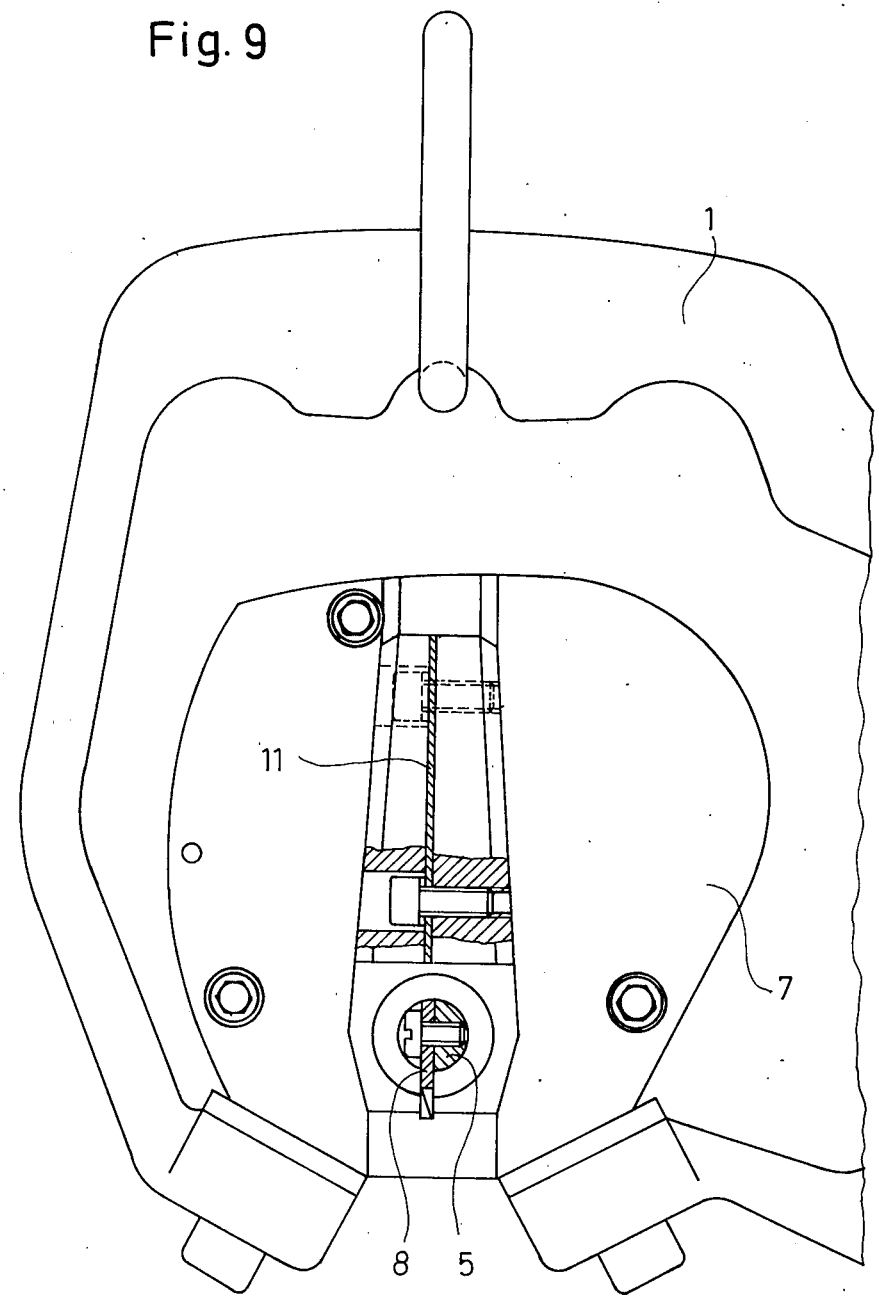

4,114,270

BUTCHER'S MEAT SAW

BACKGROUND OF THE INVENTION

The present invention relates to a reciprocating saw. More particularly, this invention concerns a butcher's meat saw.

An electrically or pneumatically driven meat saw normally has a housing from which extends a thin fixed guide plate having one edge that serves as a guide along which an elongated blade may slide. To this end the blade has one longitudinal edge formed with cutting teeth and its opposite longitudinal edge is shaped to fit with the edge of the guide. In this manner it is possible for a relatively inexpensive and replaceable blade to be securely guided on the saw for reciprocating in a cutting direction defined by the edge of the guide.

In the most common construction the blade is formed of a three-layer laminate. Each of the layers is formed as a plate, and the middle plate is of the same thickness as the plate forming the guide of the saw, but is less wide than the other two plates so that the three plates together form a groove in which the edge of the guide is received. In this manner excellent guiding of the blade on the saw is ensured.

The principal disadvantage of this construction is that once material enters between the juxtaposed edges of the blade and guide, it is almost impossible to clean out such material without disassembly of the saw. In particular when fatty material, blood or the like finds its way into the space between the juxtaposed edges of the blade and guide it then becomes necessary thoroughly to clean the saw at the end of the day in order to prevent this material from spoiling and damaging the saw. This operation, as mentioned above, requires at the very least removal of the blade from the guide for cleaning of the juxtaposed edges, as even dipping the entire blade and guide assembly into a cleaning solution and running the saw does not clean out the space between the blade and the guide.

Another disadvantage of the known reciprocating saws is that the drives for reciprocating the blades are relatively complex. Furthermore, these drives normally create considerable throw, making the saw difficult to hold and guide accurately.

SUMMARY OF THE INVENTION

It is therefore an object of the present invention to provide an improved reciprocating saw.

Another object is to provide an improved butcher's meat saw which overcomes the above-given disadvantages.

A further object is the provision of such a saw whose blade is relatively easy to clean.

Yet another object is to provide an improved drive for a reciprocating saw.

These objects are attained according to the present invention in a reciprocating saw of the above-described general type wherein the blade element has an edge which slides along an edge of the guide element. One of these edges is formed with at least two longitudinally extending and transversely spaced tabs which extend from this one edge toward and past the other edge and form a groove receiving the other edge. Furthermore, one of the elements is formed at the respective edge with a longitudinal succession of laterally open notches that expose the edge of the other element.

Thus in accordance with the present invention at least one of the edges is exposed through these notches. Thus any grit or the like that works its way into the space between the edges will quickly finds its way out through the notches and prevent excessive wear of the two parts. Furthermore, if the entire blade assembly is dipped in a cleaning liquid the saw can be operated so as to very effectively to flush out any material between the blade edge and the guide edge. At the same time it is possible to produce the saw according to this invention at no increased cost over the prior-art cost, and indeed frequently at less cost, while at the same time the blade is accurately held and displaceable along the guide.

According to further features of the present invention the notches open alternately in opposite lateral directions. The groove and the other edge can be complementarily part-cylindrical or the other edge can be formed with a ridge and with a pair of shoulders flanking the ridge so that the tabs embrace the ridge and slide on the shoulders next to it.

In accordance with a particularly advantageous feature of this invention the blade itself is formed with two rows of tabs spaced apart, with one row to each side of the groove. In addition the tabs are longitudinally spaced apart and the blade edge is formed with the above-mentioned notches that serve to space the tabs longitudinally apart. In this arrangement the groove formed between the tabs which to this end have a planar faces defining the groove is V-shaped. The faces defining the groove lie in an angle between 30° and 90° to each other, preferably 60°. Furthermore these faces overlap transversely of the direction by a distance of approximately 3 mm so that the saw blade can be relatively easily produced by standard machining techniques without the necessity of making it to extremely fine tolerances.

According to other features of this invention the tab spacing, that is the longitudinal spacing between tab centers, is a multiple of the longitudinal spacing between the cutting teeth of the blade. According to this invention the tab spacing is substantially twice the tooth spacing, namely between 10 mm and 14 mm. Thus the tab spacing may be 12 mm and the tooth spacing 6 mm.

According to yet another feature of this invention the guide element is provided remote from the housing with a pair of guide bodies that extend down from the guide edge and embrace the blade. To this end the blade element may have a front end formed with a throughgoing slot that is parallel to the direction of reciprocation of the blade. One of the guide bodies has a nose or formation engaged in this slot. Such mounting ensures that the blades will be accurately guided on the saw and will reciprocate exactly in the manner desired.

In accordance with the present invention the drive means in the housing of the saw which serves for reciprocating the blade in a reciprocation direction has a drive member which is rotatable in the housing about a drive axis generally parallel to the reciprocation direction. A skew pin is carried on the drive member and extends along and defines a skew axis inclined and intersecting the drive axis. A ring is carried by means of roller bearings on the skew pin for rotation about the skew axis and has a laterally projecting drive pin which defines a pin axis which is not parallel to the drive and skew axes. Thus rotation of the drive member about the drive axis can rock the pin in the reciprocation direction. A coupling member extends generally in the reciprocation direction and is connected between the drive pin and the rear end of the blade element so that rocking of the pin is transmitted to the blade element.

According to further specific features of the drive system according to this invention the pin axis extends at a right angle to the skew axis. In fact the skew, pin, and drive axes all intersect at a common point.

The coupling member of the drive system according to this invention is formed with a recess and is provided therein with a holding member carried in bearings and snugly receiving the drive pin. This holding member is rockable in the coupling member about a holding axis transverse to the pin axis and to the reciprocation direction. To reduce throw the coupling member is at least partially hollow and is secured by means of a chuck or screws to the rear end of the blade.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIGS. 2 and 3 are large-scale sections taken along lines II—II and III—III of FIG. 1, respectively;

FIGS. 4, 5 and 6 are large-scale views of the left side, top edge and right side of the saw blade according to this invention;

FIGS. 7 and 8 are large-scale sections taken along lines VII—VII and VIII—VIII, respectively, of of FIG. 4;

FIGS. 9 and 10 are large-scale sections taken along lines IX—IX and X—X of FIG. 1; and FIGS. 11 and 12 are detailed views similar to FIG. 3 illustrating other arrangements according to this invention.

SPECIFIC DESCRIPTION OF PREFERRED EMBODIMENTS

Figure 1:
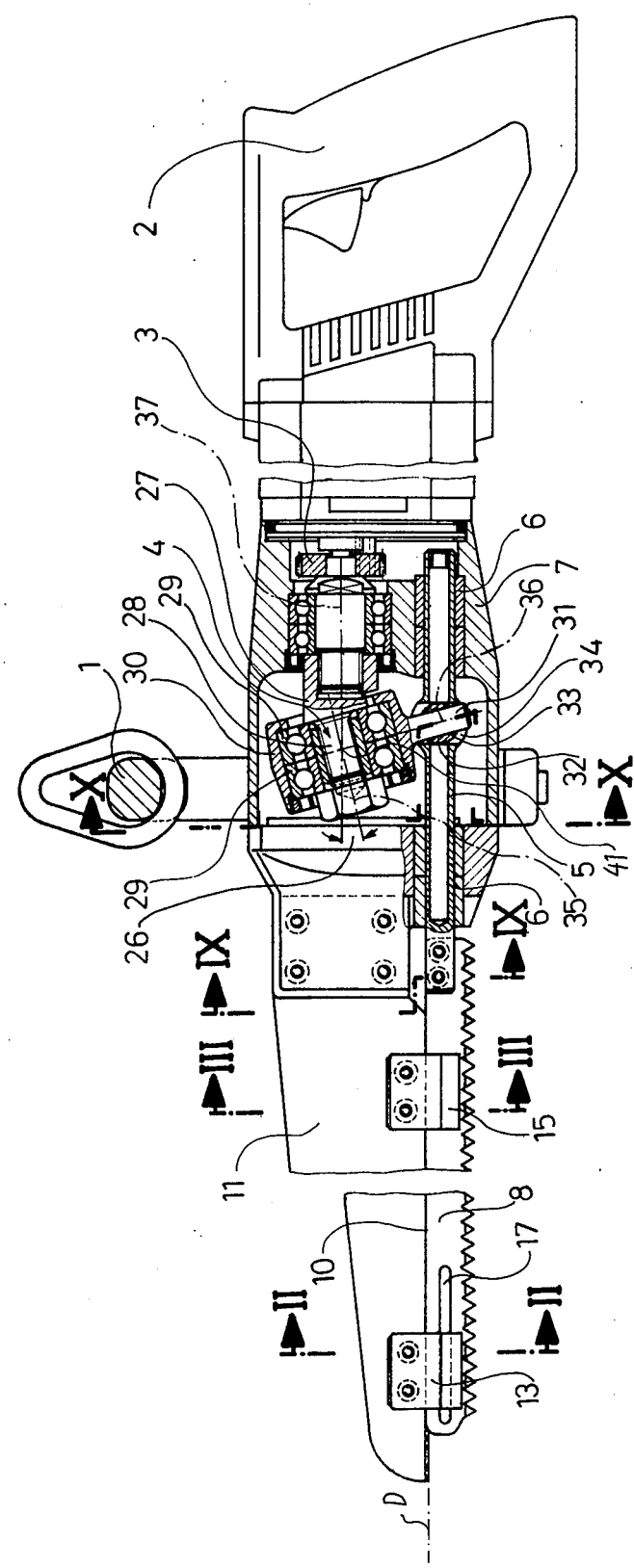
FIG. 1 is a side view partly in section through a reciprocating saw according to this invention.
Figure 10:
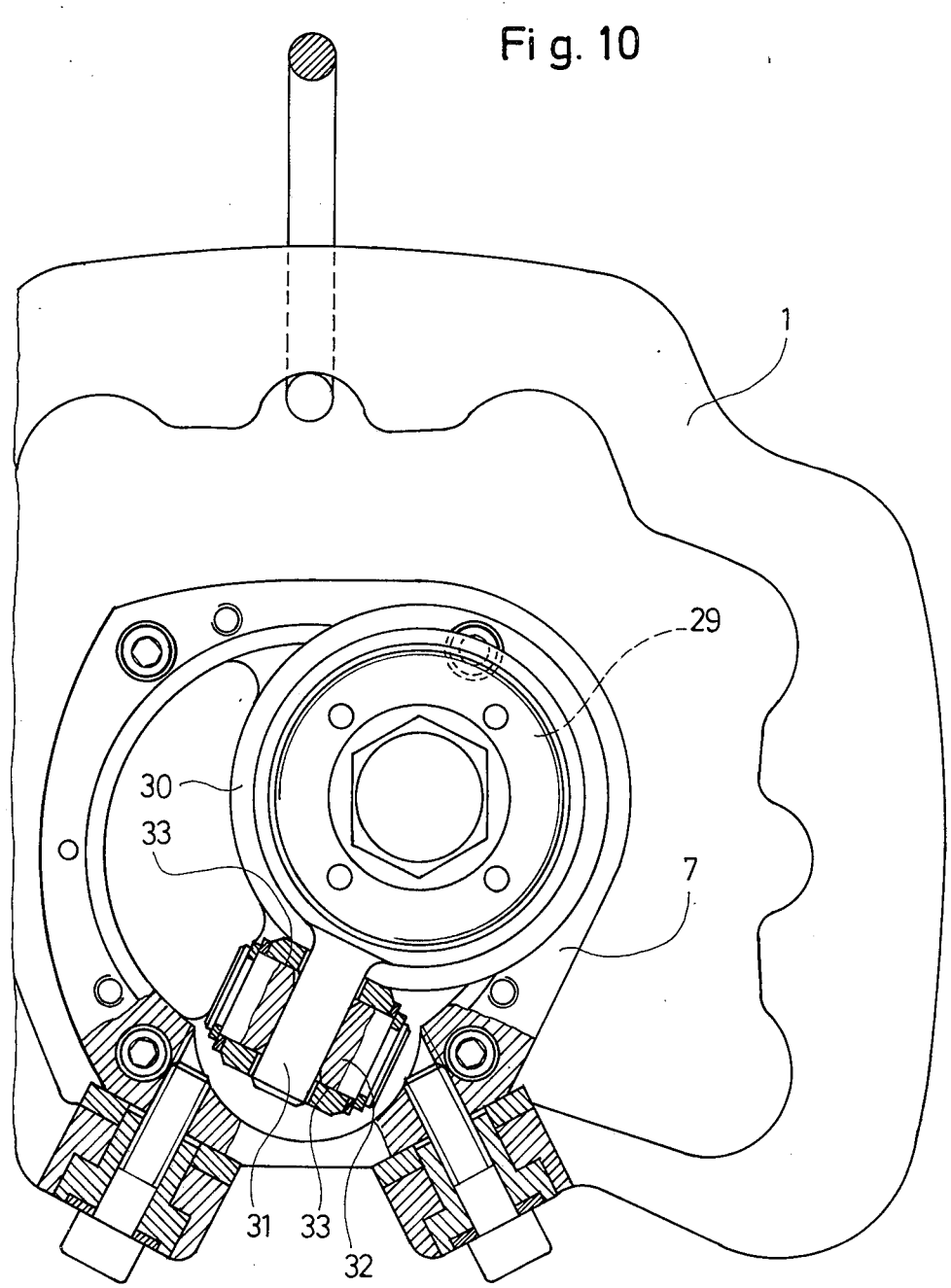

As shown in FIGS. 1, 9 and 10, the saw according to this invention has a housing 7 which can be hung from a counterbalancing arrangement in a well known manner by means of a ring 1. The housing 7 has at its rear end a handle 2 and is provided internally with a motor having an output pinion 3 rotatable about an axis 37 and connected to a drive member 4. A coupling arrangement described below in greater detail interconnects the rotatable drive member 4 to a hollow coupling rod 5, slidable in direction D in a sleeve 6 in the housing 7. The front end of this coupling rod 5 is secured by screws to the rear end of a flat steel blade 8 having a front edge formed with a row of teeth 39 and a back edge 9 riding on a guide edge 10 of a blade-like guide plate 11 bolted to the housing 7. The edges 9 and 10 extend in the direction D for sliding of the blade 8 on the guide 11. In addition as shown in FIGS. 2 and 3, the guide plate 11 is provided with a pair of front guide bodies 12 and 13 screwed to opposite faces of the guide plate 11 and embracing the blade 8. The blade 8 to this end is formed with a longitudinally extending slot 17 into which projects a formation or nose from the guide body 12. Similarly between this front guide 12, 13 and the housing 7 there is provided an intermediate guide formed by a pair of guide bodies 14 and 15 identical to the guide bodies 12 and 13 except that neither is provided with a nose 16 and the blade 8 is not slotted in this intermediate region.

The back edge 9 of the blade 8 is formed with a V-shaped groove 18 into which engages a V-shaped edge formation 19 on the edge 10 of the guide plate 11.

FIGS. 4–8 show how the back edge 9 of the blade 8 is formed on its right side seen from the rear in the position of use with a row of tabs 20 and on its left side with a row of tabs 21. These tabs have beveled faces which overlap by 3 mm and which together form an angle 22 of 60°. Each of the tabs 20 is provided between a pair of the tabs 21. Furthermore, the tabs 20 and 21 are separated by rectangular notches 23 at which the edge 10 of the guide 11 is exposed. The teeth 39 are spaced apart by a distance 25 equal to half of the spacing 24 between the center of adjacent tabs 20 and 21. The distance 24 is equal to 12 mm and the distance 25 is equal to 6 mm. In addition, the notches have longitudinal overlap 40 equal here to 1 mm.

It is possible as shown in FIG. 11 to form a guide 11' with an edge constituted by a rectangular-section ridge 19' flanked by a pair of shoulders 19a'. Furthermore, in this arrangement the blade 8' has a back edge 9' which forms a groove 18' between generally rectangular tabs 20' and 21' whose facing surfaces are parallel to each other but which are rounded at their bases. Notches 38 separate the tabs 21' and notches 38' separate the tabs 20'.

FIG. 12 shows yet another arrangement wherein a guide 11'' has an edge 10'' of part-cylindrical contour which fits in a groove 18'' formed in the back edge 9'' of a blade 8''. In addition, the edge 10'' is formed with notches 38''.

As best shown in FIGS. 1, 9 and 10, the drive member 27 defines the drive axis 37 and carries a skew pin 28 on which a ring 30 is rotatable by means of bearings 29 about an axis 35 offset by an angle 26 of 15° from the axis 37. This ring 30 carries a drive pin 31 having an axis 36 which extends at a right angle to the axis 35 and intersects the axes 35 and 37 at a point 41. The drive pin 31 engages in a holding member or pin 32 received in bearings 33 in a cutout 34 formed in an enlarged portion of the coupling rod 5. Thus as the drive member 27 is rotated about the axis 37 the ring 30, which cannot rotate relative to the housing 7, will merely rock about an axis passing through the point 41 and perpendicular to a plane defined by the axes 36 and 37. This motion will cause the rod 5 to reciprocate in the direction D and, therefore, to reciprocate the blade 8 in this direction D.

The saw according to the present invention can easily be cleaned since any particles caught between the edges 9 and 10 can readily be flushed therefrom without disassembly of the saw. The stroke of blade 8 relative to the guide 11 is greater than the distance 24 so that operation of the saw will expose all the edge 10, thereby making cleaning a relatively simple task. What is more the drive according to this invention has a very small throw so that the saw can easily be handled in virtually any position.

It will be understood that each of the elements described above, or two or more together, may also find a useful application in other types of machine differing from the types described above.

While the invention has been illustrated and described as embodied in a meat saw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A reciprocating saw, comprising a housing; a guide element secured to said housing and having an edge defining a direction; an elongated blade element having a longitudinal succession of cutting teeth, a rear end, and an edge extending along and slidable on said edge of said guide element, one of said edges being V-shaped; a first plurality of tabs and a second plurality of tabs transversely spaced from one another on another of said edges so as to define a V-shaped groove therebetween in which said one V-shaped edge is slidably received, said tabs of each of said first and second pluralities being longitudinally spaced from one another so as to define a first plurality of notches and a second plurality of notches therebetween, respectively, the tabs of said first plurality being longitudinally offset relative to the tabs of said second plurality so that said first plurality of notches is longitudinally offset relative to said second plurality of notches, and said notches alternatingly communicate with said V-shaped groove on respective lateral sides thereof, whereby successive longitudinal increments of said one edge are fully exposed on one and on the other lateral side of said other edges, respectively, so that said one edge is laterally accessible over its entire length; and drive means in said housing connected to said rear end for reciprocating said blade element in said direction wherein said tabs have faces defining said grooves and lying at an angle of between 30° and 90° to each other, and said faces overlap transversely of said direction.

2. The saw as defined in claim 1, wherein said blade element and said guide element are integral.

3. The saw defined in claim 1 wherein the longitudinal spacing between tab centers is a multiple of the longitudinal spacing between the cutting teeth.

4. The saw defined in claim 3 wherein the tab spacing is substantially twice the tooth spacing.

5. The saw defined in claim 4 wherein the tab spacing is between 10 mm and 14 mm.

6. The saw defined in claim 1 wherein said one edge is the blade edge and said other edge is the guide edge, said guide edge being continuous and smooth and said blade edge being formed with said notches.

7. The saw defined in claim 6 wherein said guide element is provided remote from said housing with a pair of guide bodies extending from said guide edge and embracing said blade element.

8. The saw defined in claim 7 wherein said blade element has a front end formed with a slot parallel to said direction, one of said guide bodies having a formation engaged in said slot.

9. The saw defined in claim 1 wherein said drive means includes:
a drive member rotatable in said housing about a drive axis generally parallel to said direction;
a skew pin carried on said drive member and extending along and defining a skew axis inclined to and intersecting said drive axis;
a ring rotatable on said skew pin about said skew axis and having a laterally projecting drive pin defining a pin axis nonparallel to said drive and skew axes, whereby rotation of said drive member about said drive axis rocks said pin in said reciprocation direction; and
a coupling member extending generally in said direction and connected between said drive pin and said rear end of said blade element, whereby the rocking of said pin is transmitted to said blade element.

10. The saw defined in claim 9 wherein said pin axis intersects and extends generally at a right angle from said skew axis.

11. The saw defined in claim 9 wherein said drive, skew, and pin axes intersect at a common point.

12. The saw defined in claim 9 wherein said drive means further includes roller bearings between said ring and said skew pin.

13. The saw defined in claim 9 wherein said coupling member is formed with a recess and is provided therein with a holding member snugly receiving said drive pin and rockable in said coupling member about a holding axis transverse to said pin axis and said reciprocation direction.

14. The saw defined in claim 9 wherein said coupling member is at least partially hollow.

15. The saw defined in claim 9 wherein said coupling member is formed with a recess and is provided therein with a holding member and with bearings supporting said holding member for rocking about a holding axis transverse to said pin axis and said reciprocation direction, said drive pin being snugly received in said holding member.

16. The saw defined in claim 9 wherein said drive axis is parallel to said direction.

* * * * *